Figure 1:
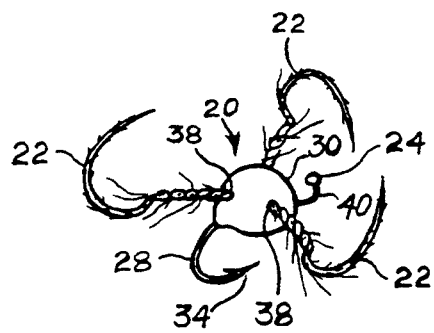

United States Patent [19]

Ahlsten

[11] Patent Number: 5,335,442
[45] Date of Patent: Aug. 9, 1994

[54] MOISTURE ACTIVATED SELF-PROPELLED FISHING LURE

[76] Inventor: James C. Ahlsten, 1200 White Oak Dr., Santa Rosa, Calif. 95409

[21] Appl. No.: 975,653

[22] Filed: Nov. 13, 1992

[51] Int. Cl.⁵ .............................. A01K 85/00
[52] U.S. Cl. .................. 43/42.37; 43/44.83; 43/26.2
[58] Field of Search ............. 43/42.37, 26.2, 42.22, 43/42.26, 42.27, 44.83, 42.49

[56] References Cited

U.S. PATENT DOCUMENTS

| | | | |
|---|---|---|---|
| D. 217,765 | 6/1970 | Peterson | 43/42.37 |
| 895,493 | 8/1908 | O'Brien | 43/44.83 |
| 1,471,959 | 10/1923 | Halferty | 43/44.83 |
| 1,497,019 | 6/1924 | Hennings | 43/42.49 |
| 2,232,102 | 2/1941 | Dudek | 43/26.2 |
| 2,577,466 | 12/1951 | Jones | 43/44.83 |
| 2,816,391 | 12/1957 | Michael | 43/26.2 |
| 2,847,220 | 8/1958 | Heffron | 43/44.83 |
| 2,884,730 | 5/1959 | Westerfield | 43/26.2 |
| 2,917,859 | 12/1959 | Troyer | 43/26.2 |
| 2,922,244 | 1/1960 | Benner | 43/26.2 |
| 2,984,927 | 5/1961 | Coulter | 43/26.2 |
| 3,791,064 | 2/1974 | Van Iseghem . | |
| 3,936,971 | 2/1976 | McGahee | 43/44.83 |
| 4,038,773 | 8/1977 | Castelletti . | |
| 4,535,562 | 8/1985 | Fry | 43/44.83 |
| 4,581,841 | 4/1986 | Gish . | |
| 4,819,366 | 4/1989 | Manno | 43/44.83 |
| 5,035,075 | 7/1991 | Pearce . | |
| 5,203,106 | 4/1993 | Huppert | 43/44.83 |

Primary Examiner—Kurt C. Rowan

[57] ABSTRACT

A fishing lure having a body with attached twisted leg-like appendages which set into motion and untwist when moistened, simulating live bait movement.

7 Claims, 2 Drawing Sheets

MOISTURE ACTIVATED SELF-PROPELLED FISHING LURE

BACKGROUND—FIELD OF INVENTION

This invention relates to artificial fishing lures and in particular to fishing lures which have self-propelled means to simulate live bait movement.

BACKGROUND—DESCRIPTION OF PRIOR ART

Many artificial fishing lures which attempt to simulate live bait movement have been proposed in the past. Some embodiments include mechanisms which operate when the lure is pulled through the water by a line, such as U.S. Pat. No. 4,581,841 to Gish (1986) and U.S. Pat. No. 3,791,064 to Van Iseghem (1974). These types of lures are generally large in size, costly to manufacture and movement of the line through water distracts the fish.

Other lures have internal storage mechanisms such as U.S. Pat. No. 5,035,075 to Pearce (1991) the structure of these types of lures contain gears, springs, and other mechanisms which operate extremities. These lures also tend to be costly to manufacture and ineffective in simulating the motion of live bait. The same appears to be true of U.S. Pat. No. 4,038,773 to Castelletti, Spector (1977), which uses effervescent material to generate gas for propelling elements of the lure.

OBJECTS AND ADVANTAGES

Accordingly, several objects and advantages of my invention are as follows: the structure of this invention is very small and light in weight, similar to that of an artificial fly fishing lure. Unlike existing very small light weight lures, when this invention is placed into water, its leg-like appendages absorb moisture and set into motion, simulating the movement of a helpless bug which has fallen into the water. The size, weight, color, shape, and movement of this invention is very realistic to that of live bugs. This lure is simple in structure and inexpensive to manufacture. Further objects and advantages of my invention will become apparent from a consideration of the drawings and ensuing description.

DRAWING FIGURES

Figure 2:
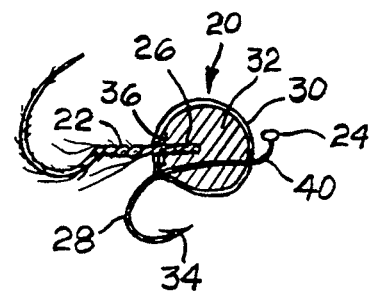
Figure 3:
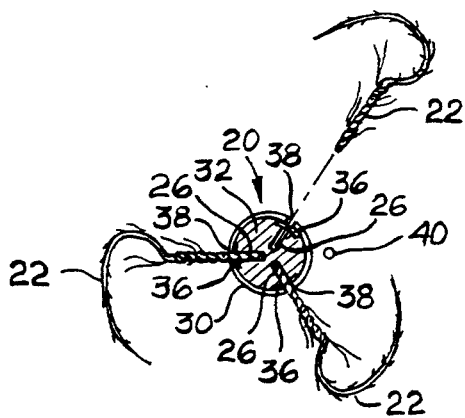
Figure 4:
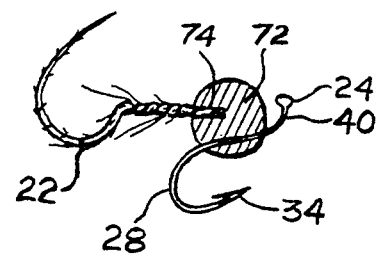
Figure 5:
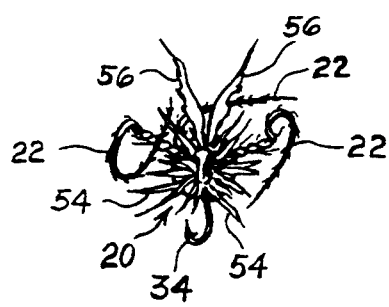
Figure 6:
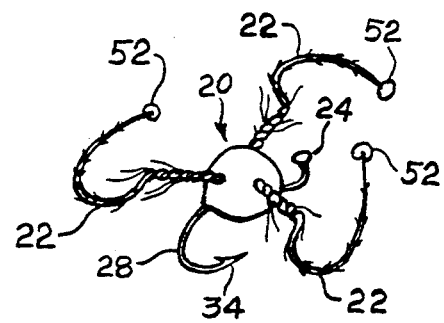
Figure 7:
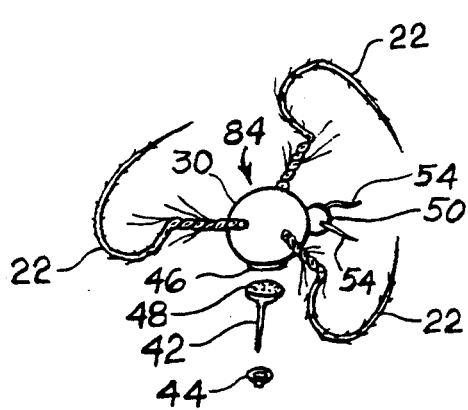
Figure 8:
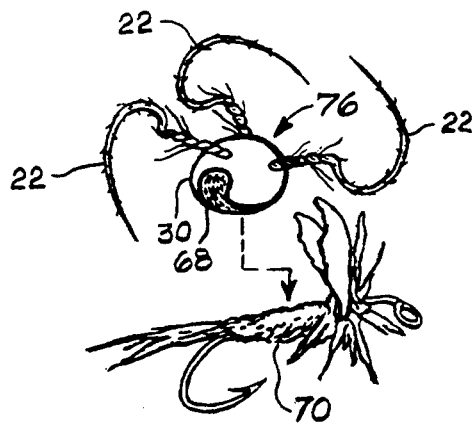
Figure 9:
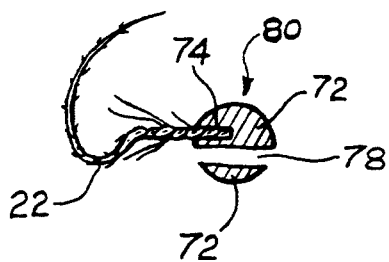
Figure 10:
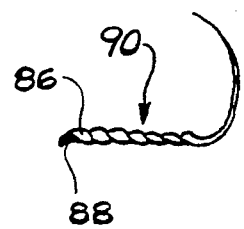
Figure 11:
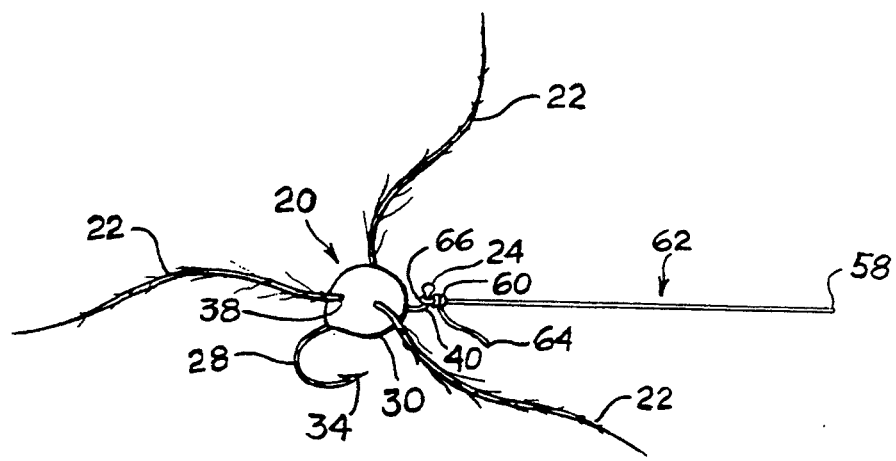

FIG. 1 is a perspective view of the fishing lure.
FIG. 2 is a side cross section view of the fishing lure.
FIG. 3 is a top cross section view of the fishing lure.
FIG. 4 is a side cross section view of an alternate embodiment of the lure.
FIG. 5 is a front perspective view of the fishing lure.
FIG. 6 is a perspective view of the fishing lure with styrofoam ball extremities.
FIG. 7 is a perspective view of a novelty lure with a pin for attachment to a garment.
FIG. 8 is a perspective view of a modified body with an open cavity.
FIG. 9 is a side cross section view of a modified body with a open ended duct.
FIG. 10 is perspective view of laminated leg-like appendage.
FIG. 11 is a perspective view of the fishing lure with leg-like appendages in an untwisted state.

Reference Numerals in Drawings 20 body
22 leg-like appendages
24 head
26 receptacle
28 hook shaft
30 semi-rigid coating
32 styrofoam fill
34 barb with point
36 elastic washer
38 receptacle opening
40 neck
42 pin
44 clasp
46 loop fastener
48 hook fastener
50 body member
52 styrofoam ball extremity
54 hair extremity
56 feather extremity
58 retrieving end of line
60 slip knot
62 line
64 loose end of knot
66 loop
68 cavity
70 existing artificial lure
72 closed cell foam rubber
74 cylindrical cavity
76 modified body with cavity
78 passage
80 modified body with passage
84 novelty body
86 outer strip
88 inner strip
90 laminated leg-like appendage

DESCRIPTION—FIGS. 1 TO 11

A typical embodiment of the closure of the present invention is illustrated in FIG. 1, FIG. 2, FIG. 3, and FIG. 11. This lure has a body 20, which is spheroid in shape. Body 20 consists of a styrofoam fill 32 which is surrounded by an outer semi-rigid coating 30. However, the body can be formed in any desired shape and consist of many other materials such as foam rubber, plastic, wood, polyfoam, feathers, hair, etc.

The lower section of body 20 is formed around a hook shaft 28 which has two ends. One end of hook shaft 28 has a barb with point 34. The other end of hook shaft 28 contains a head 24. Head 24 is enlarged and has a greater circumference than hook shaft 28. A neck 40 is formed from a length of hook shaft 28 which is located between body 20 and head 24. Neck 40 curves upwards so as to orbit a short distance about body 20 as shown in FIG. 2. In other embodiments, more than one hook can be used and their placement can be at any desired location about body 20.

Flexible line 62 is continuous and has two ends, retrieving end 58 and loose end 64, as shown in FIG. 11. Line 62 is tied into a slip knot 60 so as to form an enclosed expandable loop 66. Loop 66 is placed over head 24 and tightened around neck 40 by pulling on line 62 at retrieving end 58. Loose end 64 of line 62 extends from knot 60 a distance which would allow one to grasp it by a finger and thumb. Any desired type of slip knot that contains an enclosed loop can be used to form knot 60.

Body 20 has three cylindrical cavities or receptacles 26, each having two ends as illustrated in FIG. 3. One end forms an opening 38 through coating 30. The other end is located within styrofoam 32 near the center of body 20. Each receptacle 26 is located symmetrically within body 20.

A twisted leg-like appendage 22 is inserted into each receptacle 26. Preferred appendages 22 are found in nature and consist of the twisted hairy-like tails attached to the seeds or fruits of many plants. These hairy-like tails uncoil or untwist when moistened and coil or twist when allowed to dry. Appendages 22 of the embodiments of FIG. 1 through FIG. 9 and FIG. 11 are from a weed, known as the red-stem filaree (Erodium cicutarium L'Her), however those of any other plants containing similar characteristics can be used. In other embodiments, there can be more or less than three appendages and their placement can be at any desired location or angle about the body of the lure.

An appendage can also be constructed by laminating two dissimilar strips of material together forming a long narrow coiled or twisted lamination 90 as illustrated in FIG. 10. The inner strip 88 of the coiled lamination must be capable of significant expansion when moistened. The outer strip 86 of the coiled lamination must not be capable of expansion or its expansion must be insignificant when moistened. When the lamination is moistened it sets into motion and uncoils or untwists. The location of the two strips in the lamination can be reversed. This would cause the lamination to coil or twist when moistened.

Receptacle 26 contains an elastic washer 36 which has a hole in its center. Washer 36 is located between coating 30 and styrofoam 32 such that the center of its hole is concentric with the center of opening 38 as illustrated in FIG. 3. The hole in washer 36 has an internal diameter which is less than the external diameter of appendage 22. Appendage 22 passes through washer 36 when inserted into receptacle 26. Washer 36 can be constructed from any resilient material such as rubber, silicon. latex, etc.

FIG. 4 illustrates an alternate embodiment which is constructed from a resilient closed-cell foam rubber 72 or other material with similar characteristics. A cylindrical cavity 74 is formed within foam rubber 72 such that one end is located near the center of the body and the other end opens through the surface of the body. Cavity 74 has an internal diameter which is less than the external diameter of appendage 22. Foam rubber 72 will compress and squeeze against appendage 22 when appendage 22 is inserted into cavity 74. Foam rubber 72 is formed around and holds hook shaft 28 in place.

FIG. 5 illustrates a typical embodiment of my lure with extremities such as feather 56 and hair 54 attached to body 20. When appendage 22 sets into motion, it strikes against and imparts motion to those extremities.

FIG. 6 illustrates a typical embodiment of my lure with a small styrofoam ball extremity 52 attached to appendage 22 with adhesives. However other extremities such as feathers, hair, cork, etc. can be attached to appendage 22.

FIG. 7 illustrates body 84 without hook shaft 28. A loop type fastener 46 is attached with adhesives to bottom of body 84. A corresponding hook type fastener 48 is attached with adhesives to the head of pin 42. A clasp with friction lock 44 receives and grasps pin 42. However, any other desired type of fastener such as a safety pin or clasp can be mounted to body 20. An additional body member 50 with styrofoam center and semi-rigid coating is attached with adhesives to body 84. Any desired number of body members can be attached to each other or to body 84. Also any desired number of appendages 22 can be attached to these body members.

FIG. 8 illustrates a modification of the lure in FIG. 1 in that hook shaft 28 has been removed. An elongated cylindrical cavity 68 is formed concentric around the space occupied by hook shaft 28 in FIG. 1. The lower portion of cavity 68 forms an opening through the bottom of modified body 76. This opening and the diameter of cavity 68 is of sufficient size that modified body 76 can be placed over and partially around the back of existing artificial lure 70 as illustrated in FIG. 8. Modified body 76 can be held fast to existing artificial lure 70 by adhesives or by the friction of body 76 pressing tightly around the body of the existing lure 70.

FIG. 9 illustrates a modification of the lure in FIG. 4 in that hook shaft 28 has been removed. An elongated passage 78 is formed concentric around the space once occupied by hook shaft 28. Passage 78 is open ended and will expand so that the body of an existing lure can be passed a desired distance through it. Passage 78 will press tightly against and hold onto the body of an existing lure. The size of modified body 76 in FIG. 8 and body 80 in FIG. 9 must correspond to the size of the desired existing lure they are intended to mount to.

OPERATION—FIGS. 1 TO 11

In operation, the moisture activated self-propelled lure works as follows:

When the lure is placed into water, twisted appendage 22 begins to absorb moisture and untwist. The movement of appendage 22 through the water causes the lure to roll from side to side and pitch up and down. This movement simulates a helpless bug which has fallen into the water and is struggling to survive. When appendage 22 is fully untwisted, as illustrated in FIG. 11, movement stops and the lure is then removed from the water. As appendage 22 begins to dry, it starts to twist and reaches a fully twisted state when completely dry, this cycle can be repeated over and over again as desired.

The preferred embodiment of this lure has a body 20 which is buoyant. Styrofoam fill 32 provides buoyancy for the lure. Semi-rigid coating 30 provides a colorful tough outer shell which coats styrofoam fill 32 and holds body 20 to hook shaft 28.

Hook shaft 28 includes a barb with point 34 which is used to hook and retain fish. Neck 40 and enlarged head 24 is a part of hook shaft 28 used for line retention. Slip knot 60 has an enclosed loop 66 which is placed over head 24 and tightened around neck 40 as illustrated in FIG. 2. The greater the pulling force exerted on retrieving end 58 of line 62, the tighter loop 66 will draw around neck 40. Enlarged head 24 keeps a tightened loop 66 from sliding off of neck 40. A pulling force exerted on loose end 64 of line 62 will cause loop 66 to expand and loosen around neck 40.

Receptacle 26 receives and holds the twisted end of appendage 22. Elastic washer 36 is a part of receptacle 26 which squeezes around and holds appendage 22. Appendage 22 can be attached to body 20 by gently inserting the twisted end into receptacle 26. Appendage 22 can be released from receptacle 26 by gently pulling on appendage 22.

The embodiment of FIG. 4 differs from the preferred embodiment of FIG. 2 in that its body is constructed from a single resilient material which is formed around and holds hook shaft 28. Cavity 74 receives and secures appendage 22 by compressing around and squeezing against it.

The embodiment of FIG. 5 has feather extremities 56 and hair extremities 54 attached to body 20. The movement of appendage 22 against these extremities causes them to displace and spring back adding life-like movement to the lure. This movement also creates ripples in the water surface enhancing realism.

The preferred embodiment of FIG. 6 has a styrofoam ball extremity 52 attached to appendage 22. Adding extremities such as styrofoam balls, hair, feathers etc. to appendage 22 amplifies the lures movement in water.

The embodiment of FIG. 7 is used for novelty purposes and does not have a fishing hook. A hook and loop fastener allows detachment of novelty body 84 from pin 42. Pin 42 is used to attach body 84 to any desired part of a garment such as a lapel. Once detached, body 84 can be placed in water for a few seconds, then set on a dry surface. Appendages 22 will untwist causing body 84 to roll and flop like a struggling bug. Additional body member 50 is added to body 84 to enhance realism.

The embodiments of FIG. 8 and FIG. 9 are used to create life-like motion in existing lures. Body 76 in FIG. 8 is shown positioned above existing lure 70. The opening of cavity 68 at the bottom of body 76 would allow body 76 to be lowered on and attached to existing lure 70. In FIG. 9, an exisiting lure can be inserted a desired distance through passage 78 of body 80. Body 80 is resilient and will squeeze against and hold tightly around the body of an existing lure.

Although preferred embodiments of the invention have been described and illustrated, it will be understood that the invention is not limited to the embodiments disclosed, but is capable of numerous rearrangements, modifications, and substitution of parts and elements without departure from the spirit of the invention. Accordingly, the scope of the invention should be determined by the appended claims and their legal equivalents.

I claim:

1. A fish lure comprising a body and one or more coiled leg-like appendages, each appendage having two ends, one end attached by means to said body, and an opposite unattached end extending externally of said body, said appendages being made of coiled hairy-like tails attached to seeds of many plants, each tail being naturally responsive to immersion in water by setting into motion and uncoiling, thereby spontaneously producing life-like movement, said lure having line attachment means and hook means.

2. A fish lure as defined in claim 1 wherein said appendages being moist and uncoiled, naturally set into motion and coil when removed from water.

3. A fish lure as defined in claim 1 wherein movement amplifying extremities are attached to said appendages.

4. A fish lure as defined in claim 1 wherein resilient feather and hair-like extremities are attached by means to said body, said appendages moving against and setting into motion said extremities.

5. A fish lure as defined in claim 1 wherein said body includes one or more elongated receptacles, each receptacle having two ends, one end located a desired distance internally of said body and an opposite end forming an opening through the exterior of said body, said receptacles having resilient constriction means expandable for accommodating insertion, retention, and removal of said appendages.

6. A fish lure comprising a body and one or more coiled leg-like appendages, each appendage having two ends, one end attached by means to said body, and an opposite unattached end extending externally of said body, said appendages being made of coiled hairy-like tails attached to seeds of many plants, each tail being naturally responsive to immersion in water by setting into motion and uncoiling, thereby spontaneously producing life-like movement, said body having an open cavity such that the body may be attached to an existing lure.

7. A fish lure comprising a body and one or more coiled leg-like appendages, each appendage having two ends, one end attached by means to said body, and an opposite unattached end extending externally of said body, said appendages being made of coiled hairy-like tails attached to seeds of many plants, each tail being naturally responsive to immersion in water by setting into motion and uncoiling, thereby spontaneously producing life-like movement, said body is resilient having an open ended passage through its substance, said passage expandable for receiving and encompassing a desired part of an existing lure.

* * * * *